US010263972B1

(12) United States Patent
Bowers et al.

(10) Patent No.: US 10,263,972 B1
(45) Date of Patent: Apr. 16, 2019

(54) AUTHENTICATING BY LABELING

(71) Applicant: EMC IP Holding Company LLC, Hopkinton, MA (US)

(72) Inventors: Kevin D. Bowers, Melrose, MA (US); Salah Machani, Thornhill (CA); Dennis Moreau, Newton, MA (US); Todd A. Morneau, Sudbury, MA (US); Deepak Pushpakar, Karnataka (IN); Samir Saklikar, Karnataka (IN); Nikolaos Triandopoulos, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 32 days.

(21) Appl. No.: 15/434,795

(22) Filed: Feb. 16, 2017

Related U.S. Application Data

(62) Division of application No. 14/227,506, filed on Mar. 27, 2014.

(51) Int. Cl.
*G06F 21/31* (2013.01)
*G06F 21/60* (2013.01)
(Continued)

(52) U.S. Cl.
CPC .......... *H04L 63/08* (2013.01); *G06F 3/04845* (2013.01); *G06F 21/31* (2013.01); *G06F 21/602* (2013.01); *G06F 2203/04803* (2013.01)

(58) Field of Classification Search
CPC ........ G06F 21/00; G06F 21/31; G06F 21/316; G06F 21/36; G06F 21/41; G06F 21/45;
(Continued)

(56) References Cited

U.S. PATENT DOCUMENTS 8,601,552 B1 12/2013 Bowers et al.
8,638,939 B1 1/2014 Casey
(Continued)

OTHER PUBLICATIONS

Jermyn et al., The Design and Analysis of Graphical Passwords, in Proceedings of the 8th USENIX Security Symposium, pp. 1-14, Washington DC, 1999.
(Continued)

*Primary Examiner* — Shanto Abedin
*Assistant Examiner* — Adrian Stoica
(74) *Attorney, Agent, or Firm* — Ryan, Mason & Lewis, LLP

(57) ABSTRACT

Methods, apparatus and articles of manufacture for authenticating by labeling are provided herein. A method includes identifying each of one or more graphical-based input elements to be associated with a computing device in response to user activity in connection with the computing device; identifying each of one or more graphical-based labels to be assigned to the one or more graphical-based input elements; displaying (i) the one or more graphical-based input elements and (ii) the one or more graphical-based labels via an interface of the computing device; generating a prompt via the computing device interface; and processing input cryptographic information entered via the computing device interface in response to the prompt against (i) the one or more graphical-based input elements and (ii) the one or more graphical-based labels.

20 Claims, 7 Drawing Sheets

(51) Int. Cl.
*H04L 29/06* (2006.01)
*G06F 3/0484* (2013.01)

(58) Field of Classification Search
CPC ...... G06F 21/46; G06F 21/602; G06F 3/0482; G06F 3/0484; G06F 3/04842; G06F 3/04845; H04L 63/00; H04L 63/08; H04L 63/083; H04L 63/0838; H04L 63/0846; H04L 9/00; H04L 9/32; H04L 9/3226; H04L 9/3231
See application file for complete search history.

(56) References Cited

U.S. PATENT DOCUMENTS

| | | | |
|---|---|---|---|
| 8,881,251 | B1 | 11/2014 | Hilger |
| 8,918,851 | B1 | 12/2014 | Iannamico |
| 2008/0148366 | A1 | 6/2008 | Wahl |
| 2008/0235788 | A1 | 9/2008 | El Saddik |
| 2009/0165104 | A1 | 6/2009 | Danielsen |
| 2009/0172810 | A1* | 7/2009 | Won ............... G06F 21/36 726/19 |
| 2010/0169958 | A1 | 7/2010 | Werner |
| 2010/0180336 | A1* | 7/2010 | Jones ............... H04L 9/3226 726/19 |
| 2011/0096997 | A1 | 4/2011 | Marciszko |
| 2012/0023574 | A1 | 1/2012 | Osborn |
| 2012/0159615 | A1 | 6/2012 | Griffin |
| 2012/0272311 | A1 | 10/2012 | Althammer |
| 2013/0036461 | A1* | 2/2013 | Lowry ............... G06F 21/36 726/19 |
| 2013/0229367 | A1 | 9/2013 | Pinch |
| 2013/0288647 | A1 | 10/2013 | Turgeman |
| 2014/0181957 | A1 | 6/2014 | Nguyen |
| 2014/0244514 | A1 | 8/2014 | Rodriguez |
| 2015/0150120 | A1 | 5/2015 | Liu |
| 2015/0213244 | A1 | 6/2015 | Lymberopoulos |

OTHER PUBLICATIONS

Suo et al. Graphical Passwords: A Survey, In Computer Security Applications Conference, 21st Annual, pp. 10-pp, IEEE, 2005.
Uellenbeck et al. Quantifying the Security of Graphical Password: The Case of Android Unlock Patterns, in Proceedings of the 20th ACM Conference on Computer and Communications Security, CCS 2013.
Wikipedia, Color Blindness, 2013. http://en.wikipedia.org/wiki/Color_blindness, Feb. 27, 2014.
Wikipedia, Prosopagnosia, 2013. http://en.wikipedia.org/wiki/Prosopagnosia, Feb. 24, 2014.
Zhao et al. On the Security of Picture Gesture Authentication, in Proceedings of the 22nd USENIX Conference on Security, pp. 383-398, Usenix Association, 2013.

* cited by examiner

AUTHENTICATING BY LABELING

CROSS-REFERENCE TO RELATED APPLICATIONS

The present application is a divisional application of U.S. patent application Ser. No. 14/227,506, filed Mar. 27, 2014, entitled "Authenticating By Labeling," incorporated by reference herein.

FIELD

The field relates generally to cryptography, and more particularly to authentication techniques.

BACKGROUND

At a basic level, "something-you-know" authentication techniques include asking a user to create some randomness for the user to remember, and having the user subsequently provide and/or input that randomness on-demand to successfully authenticate. Common examples of "something-you-know" authentication schemes include passwords, personal information numbers (PINs), life questions, etc. Unfortunately, humans are generally unable and/or unwilling to generate and recall randomness of sufficient sophistication within the context of such schemes to avoid common security vulnerabilities.

In addition to the use of passwords or PINs that lack moderate or significant entropy, attack vectors can pose challenges when authentication can be observed in progress, or when evidence of the authentication remains for later analysis. For example, a practice commonly known as shoulder-surfing is concerned with the ease of replay from watching a user provide his or her authentication information. For instance, if keystrokes are easily visible, an attacker can potentially replay the same keystrokes in the same order to break the authentication scheme. Attacks based on evidence of authentication have become increasingly prevalent with touchscreen-based devices, wherein, for example, residue left behind by a user's finger may provide hints as to the interaction required with the device to authenticate.

Accordingly, a need exists for providing a secure authentication scheme while maintaining an ease-of-use aspect.

SUMMARY

One or more illustrative embodiments of the present invention provide techniques for authenticating by labeling.

In accordance with an aspect of the invention, a method is provided comprising the steps of: establishing a set of cryptographic information, wherein said set of cryptographic information comprises (i) a set of one or more graphical-based input elements and (ii) one or more graphical-based labels assigned to the set of one or more input elements in accordance with a given arrangement; generating a prompt via a computing device interface in connection with an authentication request to access a protected resource associated with the computing device; processing input cryptographic information entered via the computing device interface in response to the prompt against the set of cryptographic information; and resolving the authentication request based on said processing.

In accordance with another aspect of the invention, a method is provided comprising the steps of: identifying each of one or more graphical-based input elements to be associated with a computing device in response to user activity in connection with the computing device; identifying each of one or more graphical-based labels to be assigned to the one or more graphical-based input elements; displaying (i) the one or more graphical-based input elements and (ii) the one or more graphical-based labels via an interface of the computing device; and generating a prompt via the computing device interface. The method additionally comprises the step of processing input cryptographic information entered via the computing device interface in response to the prompt against (i) the one or more graphical-based input elements and (ii) the one or more graphical-based labels, wherein said processing comprises establishing an arrangement of the one or more graphical-based labels assigned to the one or more graphical-based input elements provided via the input cryptographic information as a set of cryptographic information to be used in connection with an authentication request to access a protected resource associated with the computing device, wherein said authentication request is to be granted if cryptographic information input in response to said authentication request matches the set of cryptographic information.

The authentication techniques of the illustrative embodiments overcome one or more of the problems associated with the conventional techniques described previously, and provide enhanced authentication techniques while maintaining ease-of-use properties. These and other features and advantages of the present invention will become more readily apparent from the accompanying drawings and the following detailed description.

DETAILED DESCRIPTION

Figure 1:
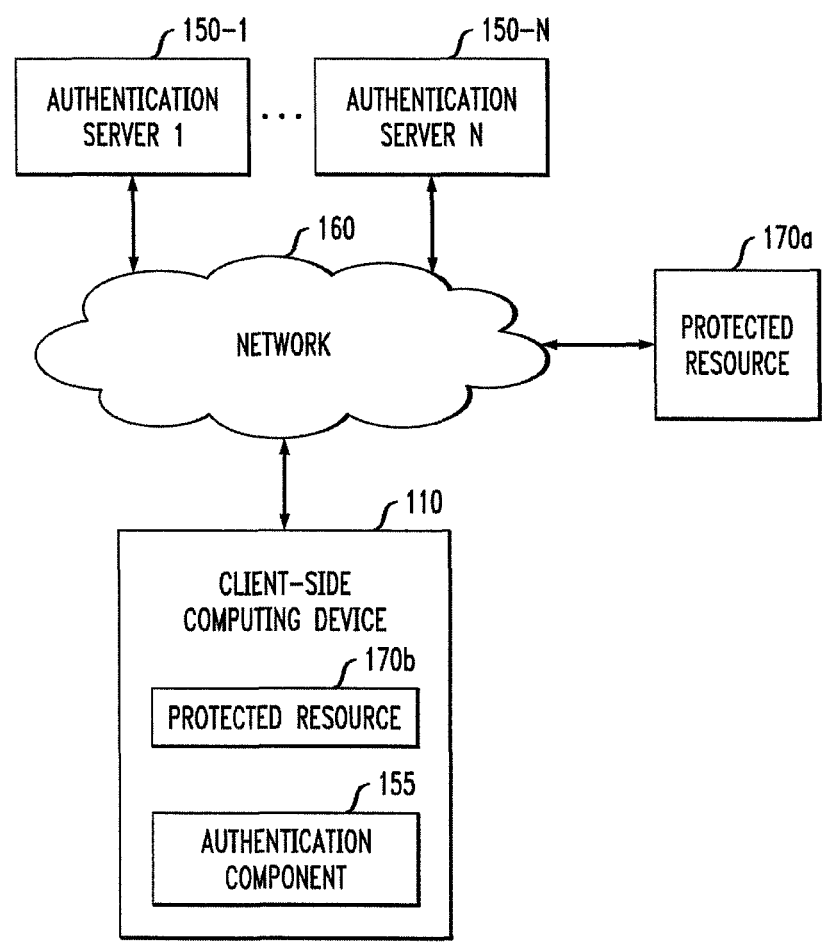
FIG. 1 is a diagram illustrating an example network environment in which one or more embodiments of the present invention can operate.

As will be described, the present invention, in one or more illustrative embodiments, provides techniques for authenticating by labeling. At least one embodiment of the invention includes modifying the manner in which items are presented to a user on a device screen and introducing a class of items in the form of labels. As further detailed herein, an aspect of the invention includes assigning and/or matching such labels to given input elements to provide the basis for authentication.

Illustrative embodiments of the present invention will be described herein with reference to exemplary communication systems and associated processing devices. It is to be appreciated, however, that the invention is not restricted to use with the particular illustrative system and device configurations shown.

Accordingly, the term communication system, as used herein, is intended to be broadly construed so as to encompass any type of system in which multiple processing devices can communicate with one another. Also, the term computing device, as used herein, is intended to be construed broadly so as to encompass any type of processing device that incorporates, among other things, cryptographic functionality (such as a computer, tablet, server, mobile telephone or device, smart phone, radio-frequency identification (RFID) tag or reader, authentication token, etc.). Similarly, the term authentication server should be understood to encompass any type of processing device or set of such devices that is operative to authenticate a password provided by an authentication token or other type of computing device. As used herein, an authentication server need not be a network-based server, and may be implemented as a portion of a device that performs other functions, as a combination of multiple servers or other devices, or in other forms.

Also, cryptographic information, as used herein, is intended to include passwords, a PIN, answers to life questions, or other authentication credentials, or values derived from such authentication credentials, or more generally any other information that a user may be required to submit in order to obtain access to an access-controlled application such as a key. By way of further example, such cryptographic information can be used for encryption, decryption, hash-based message authentication code (HMAC) operations, and/or signature operations. Additionally, as detailed herein, such information can include any form of secret sequence of characters, numbers, words, pictures, etc.

As also described herein, in accordance with at least one embodiment of the invention, cryptographic information can include input elements and labels (for example, secret labels) corresponding thereto that are selected from local memory on a user mobile device, selected from a cloud storage service, derived from a social network, etc. Additionally, in such an embodiment, some form of a digest derived from the labels and input elements will be stored for user verification purposes. Also, if an encryption key is derived from the labels and elements, and depending on the key derivation function, a salt may be stored as well.

FIG. 1 illustrates an example client-side computing device (CSCD) 110 communicating with a protected resource 170a over a network 160. As detailed further below, at least one embodiment of the invention can also include a CSCD 110 that includes a protected resource 170b residing thereon. In an example implementation, a user authenticates online with one or more authentication servers 150-1 through 150-N (hereinafter, collectively referred to as authentication servers 150) before obtaining access to protected resource 170a and/or 170b (hereinafter, collectively referred to as protected resource 170 unless otherwise specified). Additionally, in an alternative example embodiment, a user authenticates offline and/or locally on the CSCD 110 via an authentication component 155 resident on the device.

As indicated above, in at least one example embodiment of the invention described herein, a CSCD 110 can include a mobile device such as a mobile phone, a smart phone, a tablet, etc. Additionally, as depicted in FIG. 1, the network 160, may comprise, for example, a global computer network such as the Internet, a wide area network (WAN), a local area network (LAN), a satellite network, a telephone or cable network, or various portions or combinations of these and other types of networks.

According to one aspect of the invention, as noted above, the user of the CSCD 110 is authenticated by authentication servers 150 using a password (or other form of cryptographic information). The exemplary communications among the system elements 110, 150 and 170 of FIG. 1 to achieve joint authentication by the authentication servers 150 is discussed further below.

It is to be appreciated that a given embodiment of the disclosed system may include multiple instances of CSCD 110 and protected resource 170, and possibly other system components, although only single instances of such components are shown in the simplified system diagram of FIG. 1 for clarity of illustration.

As noted, the CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of cryptographic techniques in accordance with the invention.

The CSCD 110 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other cryptographic information described as being associated with a user may, for example, be associated with a CSCD device 110, a person utilizing or otherwise associated with the device, or a combination of both the person and the device.

As also depicted in FIG. 1, the authentication servers 150 are typically associated with a third party entity, such as an authentication authority, that processes authentication requests on behalf of web servers and other resources, as well as verifies the cryptographic information that is presented by a CSCD 110.

Further, the protected resource 170 may be, for example, an access-controlled application, web site or hardware device. In other words, a protected resource 170 is a resource that grants user access responsive to an authentication process, as will be described in greater detail below. For example, protected resource 170a may include an access controlled file, e-mail, a protected application, a remote application server such as a web site or other software program or hardware device that is accessed by the CSCD 110 over a network 160.

Additionally, in at least one embodiment of the invention, protected resource 170b can include one or more applications or data residing on the CSCD 110 itself. For example, such a protected resource 170b can include access to a mobile data management container for launching applications on the CSCD 110 (such as a mobile device), which can be protected requiring a successful token-based authentication in order to run the application(s) protected by the container. Further, protected resource 170b could also include an access controlled file, e-mail, a protected application, a remote application server such as a web site or other software program or hardware device that is accessed by the CSCD 110 over a network 160. Similarly, it is possible that in order to unlock the mobile platform to perform operations, a successful authentication with the security token might be required.

As described herein, at least one embodiment of the invention includes arranging elements in a configuration (for example, in a circle) to address usability and security challenges. Additionally, in at least one embodiment of the invention, the elements can include user-selected pictures. Further, such pictures can be derived from pictures stored in a local database resident on the given device (for example, a user mobile device) and/or derived from social networking sources. At least one embodiment of the invention additionally includes enabling the selection of collections of input elements and associating such collections with a separate and/or distinct image type, thereby increasing entropy and minimizing shoulder-surfing attacks.

Figure 2:
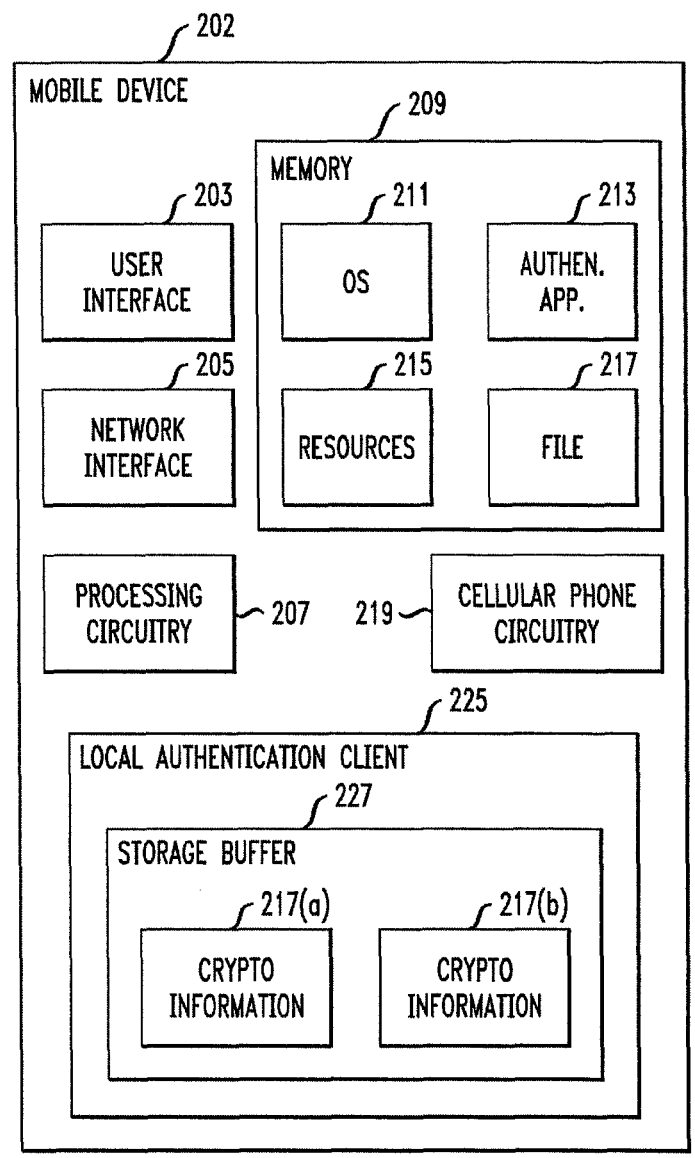
FIG. 2 is a system diagram of an exemplary mobile device on which at least one embodiment of the invention can be implemented.

FIG. 2 is a system diagram of an exemplary mobile device 202 on which at least one embodiment of the invention can be implemented. By way of illustration, FIG. 2 depicts a network interface 205 of the mobile device 202 configured to connect the mobile device 202 to a communications medium such as, for example, Wi-Fi and/or cellular telephony. Accordingly, the network interface 205 enables the mobile device 202 to communicate with the other components of an electronic environment. Additionally, the mobile device 202 includes a user interface 203 configured to receive user input and provide user output, such as a data file and/or data file location selection(s), such as described herein. One or more embodiments of the invention can include components such as a display screen, a capacitive touch display, and a push-button keyboard implemented for use in connection with the user interface 203.

Additionally, for completeness, cellular phone circuitry 219 within mobile device 202 allows the user to establish cellular phone calls with other callers having remote devices, as would be appreciated by one skilled in the art.

The memory 209 of mobile device 202 is configured to store one or more software constructs including, for example, an operating system 211, an authentication application 213, data for protected resources 215 (documents, restricted applications, etc.), a cryptographic information file 217, as well as other suitable or relevant material. Further, the processing circuitry 207 of mobile device 202 is configured to operate in accordance with the software constructs stored in the memory 209. By way of example, when the processing circuitry 207 runs the operating system 211, the processing circuitry 207 provides a secure electronic platform on which a user is able to carry out work. Such an electronic platform is capable of operating, for example, as a container to protect data and requiring user authentication before permitting access. Further, when the processing circuitry 207 runs the authentication application 213, the processing circuitry 207 communicates with the local authentication client 225 in a secure manner, for example, to obtain cryptographic information 217(*a*), 217(*b*), etc. from storage buffer 227, as additionally described herein.

It should be appreciated that the processing circuitry 207 can include one or more processors running specialized software components, such as detailed in connection with the techniques detailed herein and further depicted in FIG. 3.

In at least one embodiment of the invention, once the mobile device 202 is able to obtain valid cryptographic information, the user of the mobile device 202 is able to perform local user authentication to access protected resources. Accordingly, as noted, the mobile device 202 is provisioned with the authentication application 213 and cryptographic information file 217 holding pre-determined cryptographic information. For example, and as further detailed in connection with FIG. 3, such pre-determined cryptographic information can include one or more input elements (such as letters, numbers, characters, etc.) and one or more labels assigned to the one or more input elements. As further described herein, such cryptographic information can be learned and updated over time.

Consequently, the processing circuitry 207 of the mobile device 202 can perform a local cryptographic operation using cryptographic information 217 stored in the memory 209. In at least one embodiment of the invention the processing circuitry 207 runs the authentication application 213, which directs the user of the mobile device 202, via the user interface 203, to enter cryptographic information which is captured as one or more input elements 217(*a*). Additionally, the processing circuitry 207, via a software component resident thereon, can process input and output information, such as, for example, associated with an enrollment process of selecting one or more labels 217(*b*) to be assigned to the one or more input elements 217(*a*). While the captured cryptographic information 217(*a*) and 217(*b*) are temporarily stored in the storage buffer 227 of the local authentication client 225, the authentication application 213 compares the captured user-provided cryptographic information 217(*a*) and 217(*b*) with the appropriate expected items of cryptographic information from file 217.

If a match is determined via this comparison, the authentication application 213 permits the user to access a protected resource (such as, for example, data in association with element 215 that are stored in the memory 209).

Figure 3:
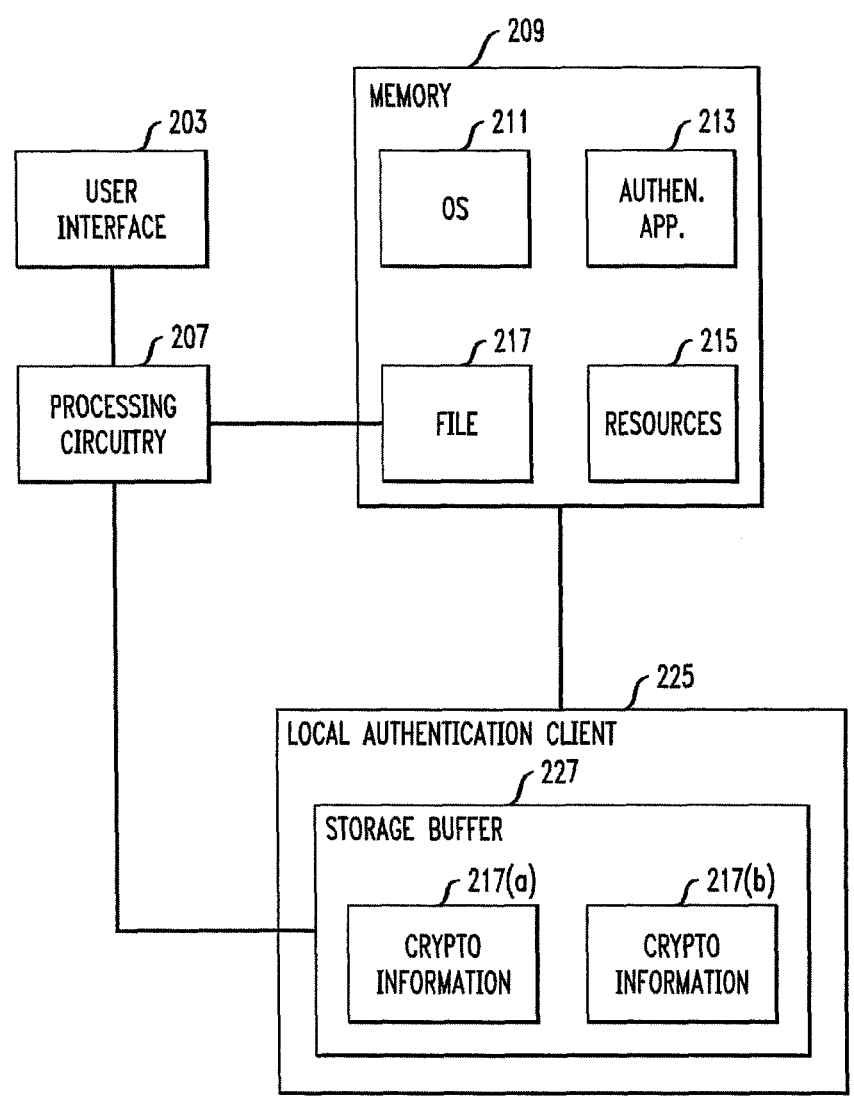
FIG. 3 is a system diagram of exemplary mobile device components, in accordance with at least one embodiment of the invention.

FIG. 3 is a system diagram of exemplary mobile device components, in accordance with at least one embodiment of the invention. As depicted in FIG. 3, a user can enter cryptographic information via user interface 203. This entered cryptographic information is captured as one or more input elements 217(*a*) and one or more labels 217(*b*). Such elements and labels can include, as additionally detailed herein, letters, numbers, characters, symbols, colors, images, etc. Upon being entered via the user interface 203, at least one embodiment of the invention can additionally include measuring input behavior via the processing circuitry 207, wherein such input behavior is associated with the input of 217(*a*) and 217(*b*) and can be learned and/or incorporated as part of the authentication mechanism, such as further described herein.

Accordingly, the captured one or more input elements 217(*a*) and labels 217(*b*) can be stored in cryptographic information file 217 as the "pre-determined" cryptographic information for a given (subsequent) cryptographic process.

Consequently, a corresponding cryptographic flow (carried out, for example, by authentication application 213 as run by operating system 211) can take the following exemplary form. The user is prompted (via user interface) to enter cryptographic information in connection with an authentication request to access a protected resource associated with the mobile device (for example, the user wishes to access and/or unlock his or her smart phone). The entered cryptographic information is captured by the processing circuitry 207 as one or more input elements 217(*a*) and corresponding one or more labels 217(*b*) assigned to the one or more entered input elements 217(*a*), and stores both 217(*a*) and 217(*b*) temporarily in the storage buffer 227 of the local authentication client 225.

Subsequently, the authentication application 213 compares the captured user-provided cryptographic information 217(a) and 217(b) with the pre-determined cryptographic information from file 217 stored in memory 209. If the user-entered input elements 217(a) match those stored in file 217 (in the sequence and/or manner proscribed by the data stored in file 217), and if the one or more labels 217(b) assigned to input elements 217(a) also match those stored in file 217 (also in the sequence and/or manner proscribed by the data stored in file 217), authentication is deemed successful and the user is granted access to the protected resource in question.

Accordingly, as detailed herein, at least one embodiment of the invention includes querying a user to create labeled collections of input elements. By way of illustration, an example embodiment of the invention is described herein in accordance with a set of labels, L and a set of input elements, I, to which those labels are applied. Presentation of such labels and input elements to a user provides an axis along which authentication can occur. For example, authentication can be carried out relative to position, relative to a given input element in that position, or a combination thereof, selecting different aspects of input elements to be assigned labels.

In at least one embodiment of the invention, a user assigns a subset of the labels l∈L to a subset of the input elements i∈I. By way of illustration, an example embodiment of the invention includes four labels (|L|=4), three of which are applied to a pair of input elements, chosen from a set |I|=12. In such an example embodiment, the fourth label is not assigned, or can be thought of being assigned to the empty set. Policy can specify whether input elements can be assigned multiple labels or not. In one or more embodiments of the invention, such policy can be set, for example, by a relevant enterprise or service provider administrator.

To select input elements and corresponding labels, the input elements are arranged on the display of the device's user interface in a shape or configuration such as a circle. Such an arrangement enables a pair of input elements to be selected without touching and/or selecting any other (unwanted) input elements. In such an example embodiment, the labels are displayed on the user interface within the configuration of input elements (for example, in the middle of the circle). In order to select the pair of input elements and the corresponding label, the user can, for example, touch (with his or her finger) the first input element on the display of the user interface, drag the input element to and through the associated label (in the middle of the circle) until touching the second input element, at which point the user can lift his or her finger to complete the sequence. Accordingly, in one continuous touch of the user interface display/screen, the user has selected a pair of input elements (the input elements selected by the starting point and ending point of the touch sequence), as well as one label (the label through which the user passed in selecting the two input elements).

Figure 4:
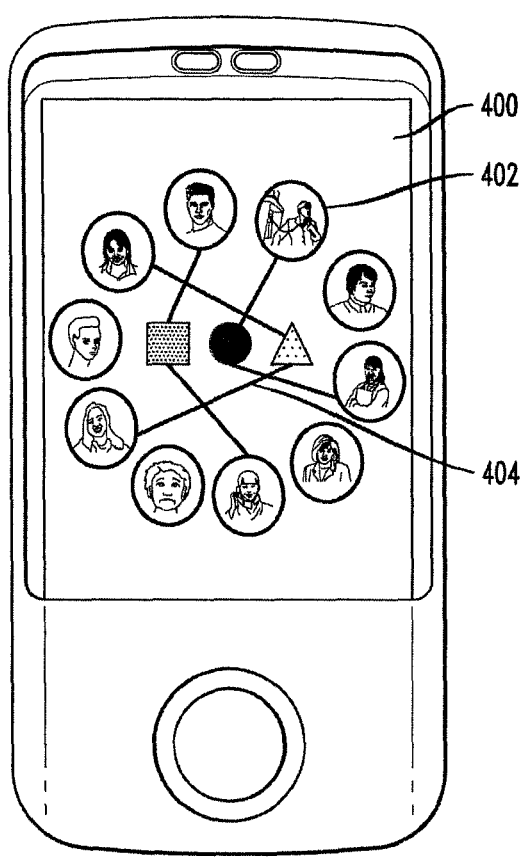
FIG. 4 is a diagram of an example device interface, in accordance with at least one embodiment of the invention.

FIG. 4 is a diagram of an example device interface, in accordance with at least one embodiment of the invention. By way of illustration, FIG. 4 depicts an example device interface 400 which displays three graphical-based labels 404 positioned within a circular arrangement of graphical input elements 402. As further described herein, an example embodiment such as depicted in FIG. 4 can be carried out by a user manually connecting (via touching the corresponding areas of the interface 400) pictures (that is, input elements 402) using one of the three shapes (that is, labels 404) in the center of the input element configuration. Such an execution can include, for instance, touching an area of the computing device interface that corresponds to one of the graphical-based labels, dragging (a finger or implement, while maintaining contact with the interface) from this label to an area of the computing device interface that corresponds with a first input element picture, and subsequently dragging (the finger or implement, while maintaining contact with the interface) from this input element picture to an area of the computing device interface that corresponds with a second input element picture.

While the above example embodiment utilizes a circular arrangement of the input elements, it should be appreciated that additional and/or other configurations and arrangements can also be encompassed by one or more embodiments of the invention. By way of example, one or more embodiments of the invention can include selecting more than two input elements per label, and/or assigning more than one label to a selected set of input elements. Additionally, while the above example embodiment detailed a finger-touch sequence, one or more embodiments of the invention can encompass numerous methods by which the user can select the input elements and associated labels. By way of example, a mouse can be used for the selection of labels and input elements on non-touch desktop computers or laptops.

One or more embodiments of the invention can also include manipulating the intra-labeling order of input elements. For example, the order in which input elements are selected within a labeling sequence can be used to enforce stronger security (by increasing entropy), or may be relaxed to enable easier user input. Order may be specified as the order in which input elements are selected, and/or order may be defined relative to location (for example, the input elements are always selected from left to right, top to bottom, etc.).

Similarly, one or more embodiments of the invention can include manipulating the inter-labeling order of input elements. For example, the order in which labels are applied may be specified or authentication can be carried out regardless of order so long as the correct input elements are given the correct labels. Ordering can be defined in terms of an order known to the user (for example, applying label x, then applying label y, then applying label z), or can be dictated by the interface (the labels appear ordered as y→z→x and must be applied in that order to the correct input elements). The labels may also be placeholders such that it is the location that is important, not necessarily the label in that location.

In order to combat potential attacks such as shoulder-surfing and smudge attacks, the input elements and/or labels can be presented in a fixed orientation or rearranged either on-demand or automatically. Permutations can be truly random, or in the case of a configuration such as a circle, input elements can be rotated while maintaining the relative ordering. Additionally, in one or more embodiments of the invention, permutation can interplay with both the intra- and inter-pair ordering described above. For example, in at least one embodiment of the invention, labels are randomly permutated but the input elements are static.

Additionally, in at least one embodiment of the invention, if permutation is enabled or implemented for either the input elements or the labels, the user may be tasked with reconfiguring one or more input elements and/or one or more labels to a known configuration at some point during the authentication to demonstrate knowledge of a prior configuration.

One or more embodiments of the invention can also include manipulation and/or variation of set sizes. By way of illustration, a larger set of input elements and/or labels can result in a stronger mechanism from a security perspective. Depending on how well a given user remembers his or her labeled input elements, larger sets may or may not introduce a significant cognitive burden on the user. That said, for ease of use, at least one embodiment of the invention includes presenting all input elements and labels on a single screen or display. Additionally, in such embodiments, the sets are static.

One or more embodiments of the invention also include input element and/or label reuse within a sequence. For example, policy can specify whether input elements can be assigned more than one label, as well as specify the number of input elements that can be assigned to a label. As noted above, such policy can be set by a relevant enterprise or service provider administrator. However, in such embodiments, users are precluded from assigning multiple labels to the same set of input elements.

As detailed herein, the input elements that are selected may depend on the label being assigned. For example, some labels may be matched with images that must be selected regardless of position on the screen, whereas other labels may require correlation with an image in a specified location. At least one embodiment of the invention includes using one or both of the above-noted configurations.

Additionally, in one or more embodiments of the invention, the size of the set of input elements can be large enough that not all input elements are used. The label set can be smaller than, larger than, or equal in size to the set of the input elements, and policy can specify whether all labels must be used in an authentication sequence or whether labels can remain unused. Having more labels than the user assigns can benefit security, assuming a sufficient number of labels are used.

In addition to the input element and label choices made by the user, there are multiple additional variables that can be measured and used for authentication purposes by one or more embodiments of the invention. For example, the velocity of the user's finger moving over and/or across the screen during an authentication sequence can be determined and factored into the authentication. Other variables can include, for example, line shape (curvature) of the user's sequence path, how the authentication device is held (that is, the orientation of the device), the size of the user's finger, the pressure applied to the device screen, and the angle at which the finger (or other selection implement) touches the screen. Such variable actions can be learned over time (with some degree of variance) and used as an element in subsequent iterations of an authentication process.

As noted above, at least one embodiment of the invention includes manipulation and/or variation of the size of the sets from which the user chooses (both input elements and labels). The size of a device screen naturally limits the number of input elements and labels that can be presented at one time. However, one or more embodiments of the invention include implementing one or more mechanisms to increase these limits by allowing input elements and/or labels to exist "off-screen" and be brought to the fore as needed or desired by the user. Examples of such mechanisms can include the following.

For instance, input elements and/or labels can exist in pages separate from the home screen of a given device. A directive such as, for example, swiping a finger across the screen from right to left (or vice versa) could replace all input elements on a first screen or page with a similar set of input elements that exists on the second screen or page. Note that in such an embodiment, the total collection of input elements available to the user remains the same between authentication attempts, but the collection of input elements is not necessarily configured in the same location. It should also be appreciated that similar techniques can be applied to create pages of labels.

Another example mechanism includes the use of stacks. In such an embodiment, the location of an input element or label can be thought of as a top-down view onto a stack. In this model, a first input element or label that is currently presented to the user can be swapped or substituted for a second input element or label "below" the first input element or label in the stack. Such a swap can be carried out, for example, by tapping the first input element or label, swiping the first input element or label away from the stack, long-pressing the first input element or label, etc.

Also, at least one embodiment of the invention includes enrolling users in an authentication system such as detailed herein. In such an embodiment, a user is queried to select the set of input elements and the set of labels to be used in the authentication system. By way of illustration, an example embodiment of the invention can include input elements represented by pictures of people selected by the user and labels represented by colored shapes (for instance, a blue triangle, a red square, a green circle, a yellow star, etc.). In such an example embodiment, the user can specify contacts from one or more social networks as the input elements, and these input elements can be represented by pictures which automatically update as profile pictures from the given social networks. Pictures can also be selected, for example, from images stored locally on the user device (for instance, as part of the contacts system) and/or images stored in a cloud service. The user may then match each selected picture or image with a given colored shape.

Once the input elements and labels have been selected through a combined process between the user and the system, the user can assign the selected labels to the selected input elements in a particular sequence and/or configuration. To do this, at least one embodiment of the invention includes presenting the user with all of the selected input elements and a single label. The user is then queried to select the appropriate or desired number of input elements to which that single label will be applied. If either the intra- or inter-labeling order is to be a factor of the authentication, such is communicated to the user at this time as well. Enrollment can also be used to teach the method of authentication, asking the user to perform the swiping motion between selected input elements while passing through the relevant label. This is then repeated for each of the selected labels.

Once the user has selected input elements for all of the desired or given labels, the user is provided an opportunity to test an authentication attempt using the full scheme including any permutation, if applicable, to promote understanding of what is required during authentication.

In one or more embodiments of the invention, multiple possibilities exist in connection with selecting input elements and labels. By way merely of example, input elements can be represented by images of objects and/or people, numbers, words, shapes, etc. Similarly, labels can be represented, for example, by shapes, colored shapes, numbers, colored numbers, weather symbols, colors, etc. Additionally, within each selected set of input elements and labels, the respective input elements and labels can vary in form and/or characteristic.

As noted above, an example embodiment of the invention includes selecting input elements and labels by use of a line connecting an input element to a label to a second input element. However, it should be appreciated that multiple other techniques can be implemented in one or more embodiments of the invention to selected input elements and labels and/or assign labels to input elements. Various examples of such techniques are detailed below.

For instance, a user can select a label and then tap on each input element to which that label should be applied. Selection of the label can be carried out, for example, by explicitly tapping the label, or labels can be presented in some order and the user can indicate (via a swipe, tapping a "Next" button, etc.) when he or she is finished labeling input elements with a given label, at which point the next label becomes active.

Alternatively, instead of tapping the input elements as discussed above, the user can swipe the input elements toward the center (or other location) of the screen where the label is displayed. Similar rotation though the labels can be implemented here as noted above.

Additionally, at least one embodiment of the invention can implement a rotary phone mechanism. Such an embodiment includes selecting a label from the center of the circle, dragging the label out to a first input element (located on the perimeter of a circular shape of images), and (like a rotary phone) rotating the circle of images until a second input element is in the "selection" location.

Further, at least one embodiment of the invention can include a bucketing technique. In such an embodiment, the labels are presented as buckets on the screen or display, and input elements are presented to the user in a stack (such as described herein). The user, accordingly, can drag, flick or otherwise manipulate the top input element from the stack to the correctly labeled bucket. The next input element in the stack takes the place of the previous input element and is similarly assigned a label by the user.

The above represent merely some possibilities that utilize the interface provided by a relatively small touchscreen (such as that of a mobile phone or tablet). It should be appreciated, however, that additional techniques can be used both in connection with a mobile device touchscreen implementation as well as in connection with implementations using separate and/or difference devices.

Figure 5:
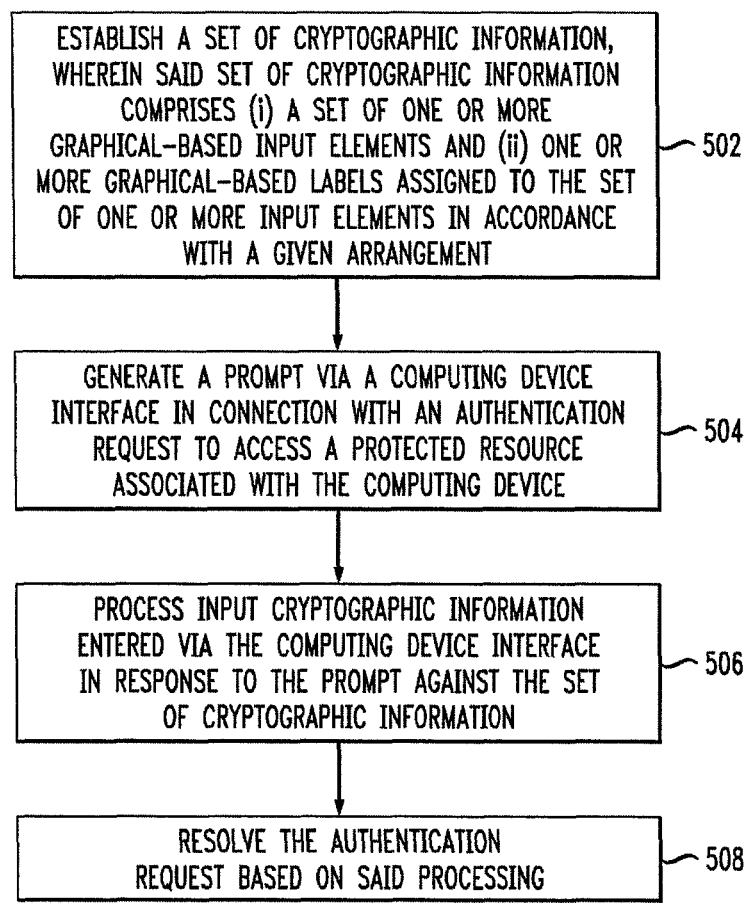
FIG. 5 is a flow diagram illustrating techniques according to an embodiment of the invention.

FIG. 5 is a flow diagram illustrating techniques according to an embodiment of the present invention. Step 502 includes establishing a set of cryptographic information, wherein said set of cryptographic information comprises (i) a set of one or more graphical-based input elements and (ii) one or more graphical-based labels assigned to the set of one or more input elements in accordance with a given arrangement. The given arrangement can include the one or more graphical-based labels assigned to the set of one or more graphical-based input elements in a chronological order. Additionally, the given arrangement can include the one or more graphical-based labels assigned to the set of one or more graphical-based input elements in a sequence defined relative to location.

By way merely of example, the set of cryptographic information can include (i) a first graphical-based input element, (ii) a second graphical-based input element, and (iii) one graphical-based label assigned to the first graphical-based input element and subsequently assigned to the second graphical-based input element.

Also, as described herein, the graphical-based input elements and/or graphical-based labels can include at least one of a number, a letter, a character, a symbol, a word, an image, a picture, a photograph, a color, a shape, a shaded shape, and a combination thereof.

Step 504 includes generating a prompt via a computing device interface in connection with an authentication request to access a protected resource associated with the computing device. The prompt can include one or more graphical-based labels displayed within a circular arrangement of multiple graphical-based input elements. Additionally, the prompt can include each of multiple graphical-based input elements and each of multiple graphical-based labels displayed on a first page or screen of the computing device interface. Further, the prompt can include a first portion of multiple graphical-based input elements and a first portion of multiple graphical-based labels displayed on a first page or screen of the computing device interface, and a second portion of said multiple graphical-based input elements and a second portion of said multiple graphical-based labels displayed on a second page or screen of the computing device interface. Also, at least one embodiment of the invention includes reordering a display of one or more graphical-based input elements and one or more graphical-based labels on the computing device interface in connection with a prompt.

Step 506 includes processing input cryptographic information entered via the computing device interface in response to the prompt against the set of cryptographic information. The input cryptographic information can be entered, for example, via user manipulation of the computing device interface. User manipulation of the computing device interface can include, for example, manipulation via of a finger, an implement, a mouse, a pointer and/or an eye tracking mechanism. Such user manipulation of the computing device interface can include, for example, selecting a first area of the computing device interface, wherein the first area corresponds with one of the one or more graphical-based labels, and dragging the graphical-based label corresponding with the first area of the computing device interface to a second area of the computing device interface, wherein said second area corresponds with one of the one or more graphical-based input elements.

Additionally, such user manipulation can also include, for example, selecting a first area of the computing device interface, wherein the first area corresponds with one of the one or more graphical-based input elements, and dragging the graphical-based input element corresponding with the first area of the computing device interface to a second area of the computing device interface, wherein said second area corresponds with one of the one or more graphical-based labels. Further, by way of additional example, the user manipulation of the computing device interface can include selecting a first area of the computing device interface, wherein the first area corresponds with a first of the one or more graphical-based input elements, and dragging the first graphical-based input element corresponding with the first area of the computing device interface through a second area of the computing device interface to a third area of the computing device interface, wherein said second area corresponds with one of the one or more graphical-based labels and the third area of the computing device interface corresponds with a second of the one or more graphical-based input elements.

Step 508 includes resolving the authentication request based on said processing. Resolving the request can include granting access to the protected resource associated with the computing device if the input cryptographic information matches the set of cryptographic information, as well as denying access to the protected resource associated with the computing device if the input cryptographic information does not match the set of cryptographic information.

Further, the techniques depicted in FIG. 5 can include determining a pattern associated with input behavior via the computing device interface over multiple iterations of said processing step. Additionally, at least one embodiment of the invention can include supplementing the set of cryptographic information to include the pattern associated with input behavior. Also, as detailed herein, the pattern associated with input behavior can include at least one of touch pressure of input via the computing device interface, touch angle of input via the computing device interface, directionality of input via the computing device interface, orientation of the computing device, and velocity of input via the computing device interface.

Figure 6:
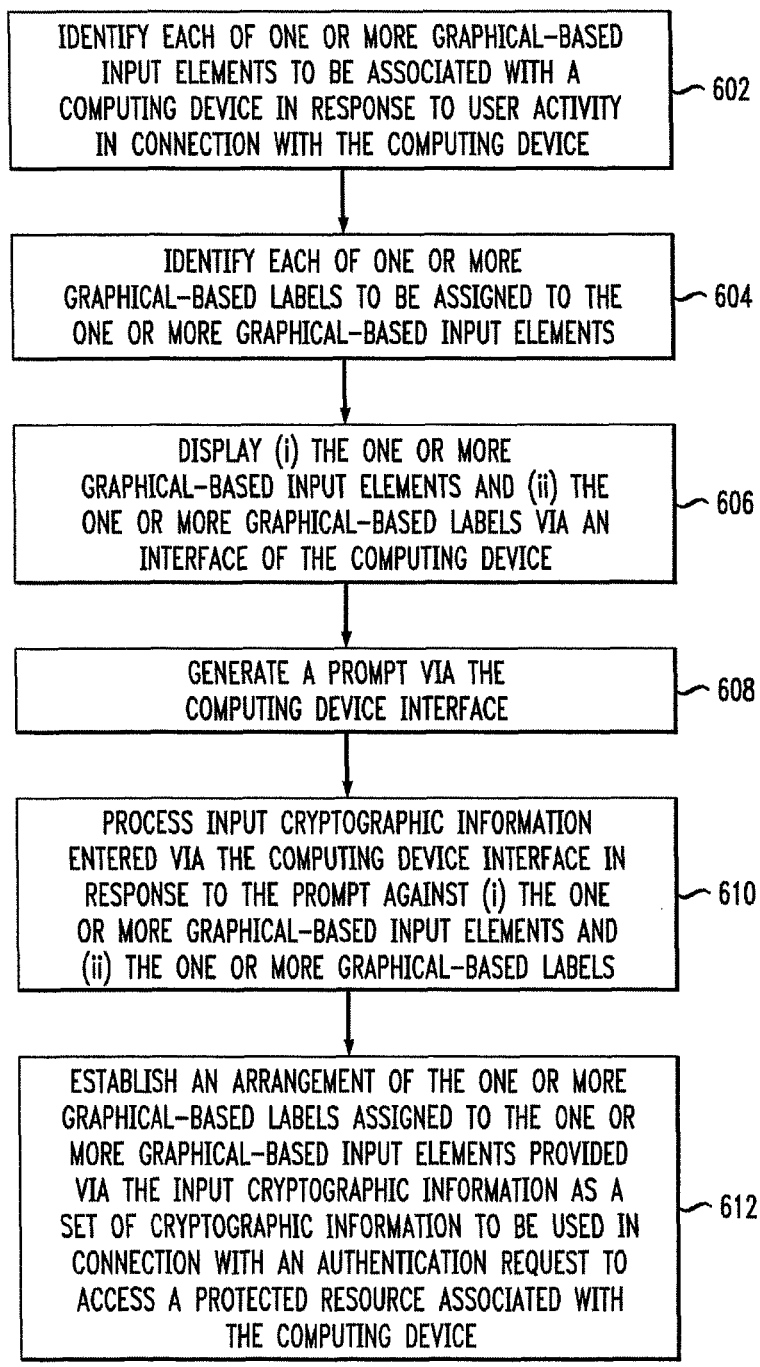
FIG. 6 is a flow diagram illustrating techniques according to an embodiment of the invention.

FIG. 6 is a flow diagram illustrating techniques according to an embodiment of the present invention. Step 602 includes identifying each of one or more graphical-based input elements to be associated with a computing device in response to user activity in connection with the computing device. Step 604 includes identifying each of one or more graphical-based labels to be assigned to the one or more graphical-based input elements. As described herein, the one or more graphical-based input elements and/or the one or more graphical-based labels can be derived from sources such as a local memory resident on the computing device, a cloud storage service, and/or a social network source.

Step 606 includes displaying (i) the one or more graphical-based input elements and (ii) the one or more graphical-based labels via an interface of the computing device. Step 608 includes generating a prompt via the computing device interface. Step 610 includes processing input cryptographic information entered via the computing device interface in response to the prompt against (i) the one or more graphical-based input elements and (ii) the one or more graphical-based labels.

Step 612 includes establishing an arrangement of the one or more graphical-based labels assigned to the one or more graphical-based input elements provided via the input cryptographic information as a set of cryptographic information to be used in connection with an authentication request to access a protected resource associated with the computing device, wherein said authentication request is to be granted if cryptographic information input in response to said authentication request matches the set of cryptographic information.

The arrangement of the one or more labels assigned to the one or more input elements can include one or more graphical-based labels assigned to the one or more graphical-based input elements in a given chronological order. Additionally, the arrangement of the one or more labels assigned to the one or more input elements can include one or more graphical-based labels assigned to the one or more graphical-based input elements in a given sequence defined relative to location.

Figure 7:
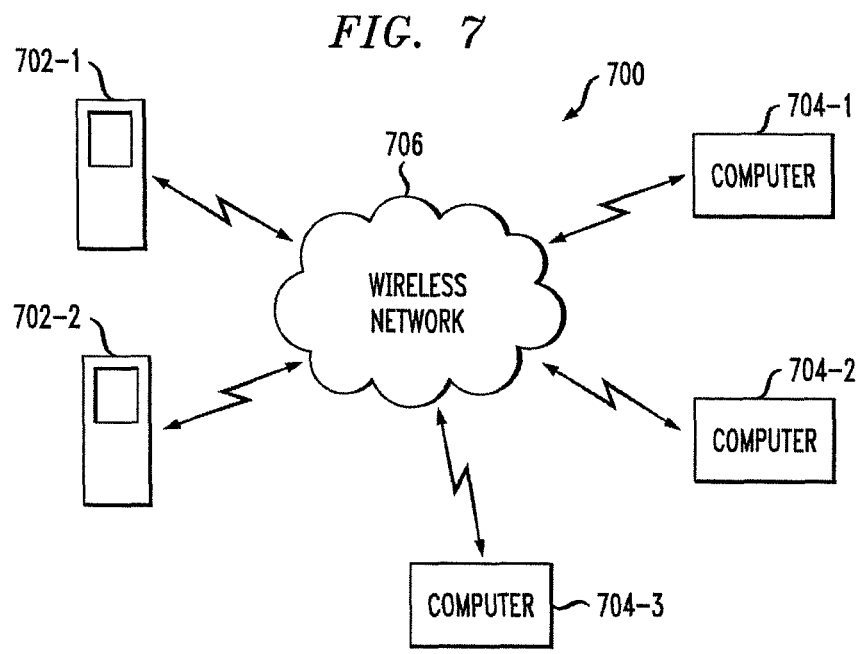
FIG. 7 shows an example embodiment of a communication system that may incorporate functionality of the type illustrated in at least one embodiment of the invention.

Cryptographic techniques of the type described herein may be implemented in a wide variety of different applications. An additional exemplary communication system application that may incorporate such techniques will now be described with reference to FIG. 7, which includes a communication system 700 comprising a plurality of mobile telephones 702-1 and 702-2 and computers 704-1, 704-2 and 704-3, configured to communicate with one another over a network 706.

Any two or more of the devices 702 and 704 may correspond to computing devices configured to implement at least one embodiment of the invention, as previously described. It is to be appreciated that the techniques disclosed herein can be implemented in numerous other applications.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 8:
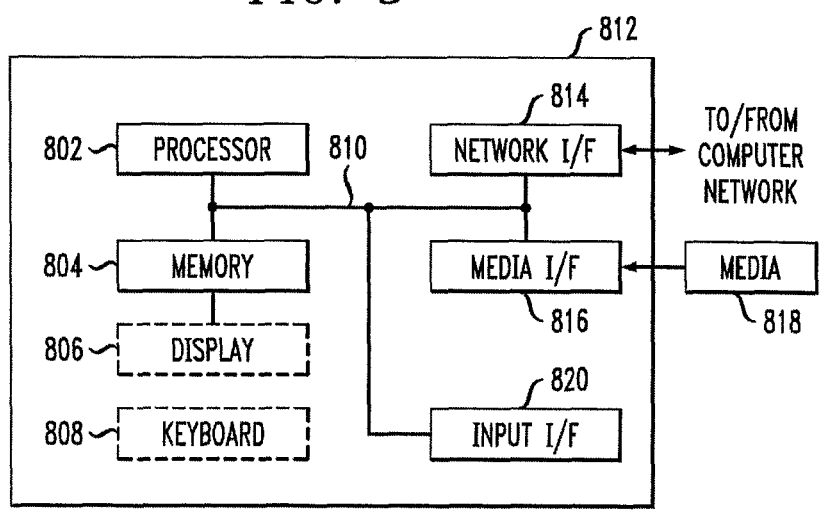
FIG. 8 is a system diagram of an exemplary computer system and/or client-side computing device on which at least one embodiment of the invention can be implemented.

By way of example, an aspect of the present invention can make use of software running on a general purpose computer. For instance, FIG. 8 is a system diagram of an exemplary computer system on which at least one embodiment of the invention can be implemented. As depicted in FIG. 8, an example implementation employs, for example, a processor 802, a memory 804, and an input/output interface formed, for example, by a display 806 and a keyboard 808. The term "processor" as used herein includes any processing device(s), such as, for example, one that includes a central processing unit (CPU) and/or other forms of processing circuitry. Additionally, the processor 802 as shown may be viewed as representing, for example, CSCD 110, authentication servers 150 and protected resource 170. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse, touch-screen, etc.) and a mechanism for providing results associated with the processing unit (for example, a printer).

The processor 802, memory 804, and input/output interface such as display 806 and keyboard 808 can be interconnected, for example, via bus 810 as part of a data processing unit 812. Suitable interconnections via bus 810, can also be provided to an input interface 820 (such as a touch-screen), a network interface 814 (such as a network card), which can be provided to interface with a computer network, and to a media interface 816 (such as a diskette or compact disc read-only memory (CD-ROM) drive), which can be provided to interface with media 818.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 808, displays 806, and pointing devices, can be coupled to the system either directly (such as via bus 810) or through intervening I/O controllers.

Network adapters such as network interface 814 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 812 as depicted in FIG. 8) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), Flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a LAN or a WAN, or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from improved authentication schemes that maintain ease-of-use properties. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
   identifying each of one or more graphical-based input elements to be associated with a computing device in response to user activity in connection with the computing device;
   identifying each of one or more graphical-based labels to be assigned to the one or more graphical-based input elements;
   displaying (i) the one or more graphical-based input elements and (ii) the one or more graphical-based labels via an interface of the computing device;
   generating a prompt via the computing device interface, wherein said prompt comprises graphical-based labels displayed within a circular arrangement of graphical-based input elements; and
   processing input cryptographic information entered via user manipulation of the computing device interface in response to the prompt against (i) the one or more identified graphical-based input elements and (ii) the one or more identified graphical-based labels, wherein said user manipulation of the computing device interface comprises:
      selection of a first area, within the circular arrangement of graphical-based input elements, of the computing device interface corresponding with a first graphical-based label of the prompt; and
      dragging of the first graphical-based label corresponding with the first area of the computing device interface within the circular arrangement (i) out to a second area, on the circular arrangement of graphical-based input elements, of the computing device interface, and then (ii) to a third area, on the circular arrangement of graphical-based input elements, of the computing device interface via rotation of the circular arrangement of graphical-based input elements, wherein the second area corresponds with one of the graphical-based input elements and the third area corresponds with a second of the graphical-based input elements, such that the respective graphical-based label is assigned to (i) the first graphical-based input element and (ii) the second graphical-based input element via a single rotary phone mechanism dragging motion on the circular arrangement of graphical-based input elements on the computing device interface; and
   wherein said processing comprises:
      establishing an arrangement of the one or more graphical-based labels assigned to the one or more graphical-based input elements provided via the input cryptographic information as a set of cryptographic information to be used in connection with an authentication request to access a protected resource associated with the computing device, wherein said authentication request is to be granted if cryptographic information input in response to said authentication request matches the set of cryptographic information; and
      determining a pattern associated with input behavior via the computing device interface over multiple iterations of said processing, wherein said input behavior comprises (i) velocity of a user's finger moving on the computing device interface during a response to the prompt, (ii) curvature of one or more input paths via a user's finger user's during a response to the prompt, (iii) the orientation of the computing device during a response to the prompt, and (iv) the pressure applied to the computing device interface by a user's finger during a response to the prompt; and
      supplementing the set of cryptographic information to include the pattern associated with input behavior.

2. The method of claim 1, wherein at least one of (i) the one or more graphical-based input elements and (ii) the one or more graphical-based labels are derived from a local memory resident on the computing device.

3. The method of claim 1, wherein at least one of (i) the one or more graphical-based input elements and (ii) the one or more graphical-based labels are derived from a cloud storage service.

4. The method of claim 1, wherein at least one of (i) the one or more graphical-based input elements and (ii) the one or more graphical-based labels are derived from a social network source.

5. The method of claim 1, wherein said arrangement comprises said one or more graphical-based labels assigned to the one or more graphical-based input elements in a given chronological order.

6. The method of claim 1, wherein said arrangement comprises said one or more graphical-based labels assigned to the one or more graphical-based input elements in a sequence defined relative to location of the one or more graphical-based input elements on the interface of the computing device.

7. The method of claim 1, wherein said user manipulation of the computing device interface comprises said user manipulation of the computing device interface via at least one of a finger, an implement, a mouse, a pointer and an eye tracking mechanism.

8. The method of claim 1, wherein said prompt comprises each of multiple graphical-based input elements and each of multiple graphical-based labels displayed on a first page of the computing device interface.

9. An article of manufacture comprising a non-transitory processor-readable storage medium having processor-readable instructions tangibly embodied thereon which, when implemented, cause at least one processing device:
to identify each of one or more graphical-based input elements to be associated with a computing device in response to user activity in connection with the computing device;
to identify each of one or more graphical-based labels to be assigned to the one or more graphical-based input elements;
to display (i) the one or more graphical-based input elements and (ii) the one or more graphical-based labels via an interface of the computing device;
to generate a prompt via the computing device interface, wherein said prompt comprises graphical-based labels displayed within a circular arrangement of graphical-based input elements; and
to process input cryptographic information entered via user manipulation of the computing device interface in response to the prompt against (i) the one or more identified graphical-based input elements and (ii) the one or more identified graphical-based labels, wherein said user manipulation of the computing device interface comprises:
selection of a first area, within the circular arrangement of graphical-based input elements, of the computing device interface corresponding with a first graphical-based label of the prompt; and
dragging of the first graphical-based label corresponding with the first area of the computing device interface within the circular arrangement (i) out to a second area, on the circular arrangement of graphical-based input elements, of the computing device interface, and then (ii) to a third area, on the circular arrangement of graphical-based input elements, of the computing device interface via rotation of the circular arrangement of graphical-based input elements, wherein the second area corresponds with one of the graphical-based input elements and the third area corresponds with a second of the graphical-based input elements, such that the respective graphical-based label is assigned to (i) the first graphical-based input element and (ii) the second graphical-based input element via a single rotary phone mechanism dragging motion on the circular arrangement of graphical-based input elements on the computing device interface; and
wherein said processing comprises:
establishing an arrangement of the one or more graphical-based labels assigned to the one or more graphical-based input elements provided via the input cryptographic information as a set of cryptographic information to be used in connection with an authentication request to access a protected resource associated with the computing device, wherein said authentication request is to be granted if cryptographic information input in response to said authentication request matches the set of cryptographic information; and
determining a pattern associated with input behavior via the computing device interface over multiple iterations of said processing, wherein said input behavior comprises (i) velocity of a user's finger moving on the computing device interface during a response to the prompt, (ii) curvature of one or more input paths via a user's finger user's during a response to the prompt, (iii) the orientation of the computing device during a response to the prompt, and (iv) the pressure applied to the computing device interface by a user's finger during a response to the prompt; and
supplementing the set of cryptographic information to include the pattern associated with input behavior.

10. The article of manufacture of claim 9, wherein at least one of (i) the one or more graphical-based input elements and (ii) the one or more graphical-based labels are derived from a local memory resident on the computing device.

11. The article of manufacture of claim 9, wherein at least one of (i) the one or more graphical-based input elements and (ii) the one or more graphical-based labels are derived from a cloud storage service.

12. The article of manufacture of claim 9, wherein at least one of (i) the one or more graphical-based input elements and (ii) the one or more graphical-based labels are derived from a social network source.

13. The article of manufacture of claim 9, wherein said user manipulation of the computing device interface comprises said user manipulation of the computing device interface via at least one of a finger, an implement, a mouse, a pointer and an eye tracking mechanism.

14. An apparatus comprising:
a memory; and
at least one processor coupled to the memory and configured to:
identify each of one or more graphical-based input elements to be associated with a computing device in response to user activity in connection with the computing device;
identify each of one or more graphical-based labels to be assigned to the one or more graphical-based input elements;
display (i) the one or more graphical-based input elements and (ii) the one or more graphical-based labels via an interface of the computing device;
generate a prompt via the computing device interface, wherein said prompt comprises graphical-based labels displayed within a circular arrangement of graphical-based input elements; and
process input cryptographic information entered via user manipulation of the computing device interface in response to the prompt against (i) the one or more identified graphical-based input elements and (ii) the one or more identified graphical-based labels, wherein said user manipulation of the computing device interface comprises:
selection of a first area, within the circular arrangement of graphical-based input elements, of the computing device interface corresponding with a first graphical-based label of the prompt; and
dragging of the first graphical-based label corresponding with the first area of the computing device interface within the circular arrangement (i) out to a second area, on the circular arrangement of graphical-based input elements, of the computing device interface, and then (ii) to a third area, on the circular arrangement of graphical-based input elements, of the computing device interface via rotation of the circular arrangement of graphical-based input elements, wherein the second area corresponds with one of the graphical-based input elements and the third area corresponds with a second of the graphical-based input elements, such that the respective graphical-based label is assigned to (i) the first graphical-based input element and (ii) the second graphical-based input element via a single rotary phone mechanism dragging motion on the circular arrangement of graphical-based input elements on the computing device interface; and wherein said processing comprises:

establishing an arrangement of the one or more graphical-based labels assigned to the one or more graphical-based input elements provided via the input cryptographic information as a set of cryptographic information to be used in connection with an authentication request to access a protected resource associated with the computing device, wherein said authentication request is to be granted if cryptographic information input in response to said authentication request matches the set of cryptographic information; and determining a pattern associated with input behavior via the computing device interface over multiple iterations of said processing, wherein said input behavior comprises (i) velocity of a user's finger moving on the computing device interface during a response to the prompt, (ii) curvature of one or more input paths via a user's finger user's during a response to the prompt, (iii) the orientation of the computing device during a response to the prompt, and (iv) the pressure applied to the computing device interface by a user's finger during a response to the prompt; and supplementing the set of cryptographic information to include the pattern associated with input behavior.

15. The apparatus of claim 14, wherein said arrangement comprises said one or more graphical-based labels assigned to the one or more graphical-based input elements in a given chronological order.

16. The apparatus of claim 14, wherein said arrangement comprises said one or more graphical-based labels assigned to the one or more graphical-based input elements in a sequence defined relative to location of the one or more graphical-based input elements on the interface of the computing device.

17. The apparatus of claim 14, wherein at least one of (i) the one or more graphical-based input elements and (ii) the one or more graphical-based labels are derived from a local memory resident on the computing device.

18. The apparatus of claim 14, wherein at least one of (i) the one or more graphical-based input elements and (ii) the one or more graphical-based labels are derived from a cloud storage service.

19. The apparatus of claim 14, wherein at least one of (i) the one or more graphical-based input elements and (ii) the one or more graphical-based labels are derived from a social network source.

20. The apparatus of claim 14, wherein said user manipulation of the computing device interface comprises said user manipulation of the computing device interface via at least one of a finger, an implement, a mouse, a pointer and an eye tracking mechanism.

\* \* \* \* \*